(12) United States Patent
Sato et al.

(10) Patent No.: US 12,715,505 B2
(45) Date of Patent: Aug. 25, 2026

(54) VEHICLE CONTROL DEVICE

(71) Applicant: AISIN CORPORATION, Kariya (JP)

(72) Inventors: Wataru Sato, Kariya (JP); Shogi Fukukawa, Kariya (JP); Yohei Nagai, Kariya (JP)

(73) Assignee: AISIN CORPORATION, Kariya (JP)

( * ) Notice: Subject to any disclaimer, the term of this patent is extended or adjusted under 35 U.S.C. 154(b) by 42 days.

(21) Appl. No.: 18/610,838

(22) Filed: Mar. 20, 2024

(65) Prior Publication Data

US 2024/0326905 A1 Oct. 3, 2024

(30) Foreign Application Priority Data

Mar. 28, 2023 (JP) ................................ 2023-050798

(51) Int. Cl.

| | |
|---|---|
| ***B62D 6/00*** | (2006.01) |
| ***B62D 6/02*** | (2006.01) |
| ***B62D 15/02*** | (2006.01) |
| ***G06V 20/59*** | (2022.01) |

(52) U.S. Cl.

CPC .............. *B62D 6/003* (2013.01); *B62D 6/02* (2013.01); *B62D 15/021* (2013.01); *G06V 20/597* (2022.01)

(58) Field of Classification Search

CPC ........ B62D 6/003; B62D 6/02; B62D 15/021; B62D 6/002; B62D 15/025; B62D 7/159; G06V 20/597; B60W 40/08

USPC .......................................................... 701/41

See application file for complete search history.

(56) References Cited

FOREIGN PATENT DOCUMENTS

| | | | | |
|---|---|---|---|---|
| CN | 102264593 A | * 11/2011 | ............... | B62D 6/10 |
| JP | 2003-063373 A | 3/2003 | | |
| JP | 2008-013045 A | 1/2008 | | |

* cited by examiner

*Primary Examiner* — Lindsay M Low
*Assistant Examiner* — Omar Morales
(74) *Attorney, Agent, or Firm* — Sughrue Mion, PLLC

(57) ABSTRACT

A vehicle control device to be mounted on a vehicle includes: a target steering angle calculation unit configured to calculate a target steering angle according to a target position to which the vehicle is to be moved or a situation of a steering angle; a ratio determination unit configured to determine a ratio of steering angles of a front wheel and a rear wheel of the vehicle based on a front-rear acceleration of the vehicle; a steering angle calculation unit configured to calculate, for the front wheel and the rear wheel, steering angles determined by multiplying the target steering angle by the ratio; and a control unit configured to instruct the front wheel and the rear wheel about the calculated steering angles of the front wheel and the rear wheel.

6 Claims, 14 Drawing Sheets

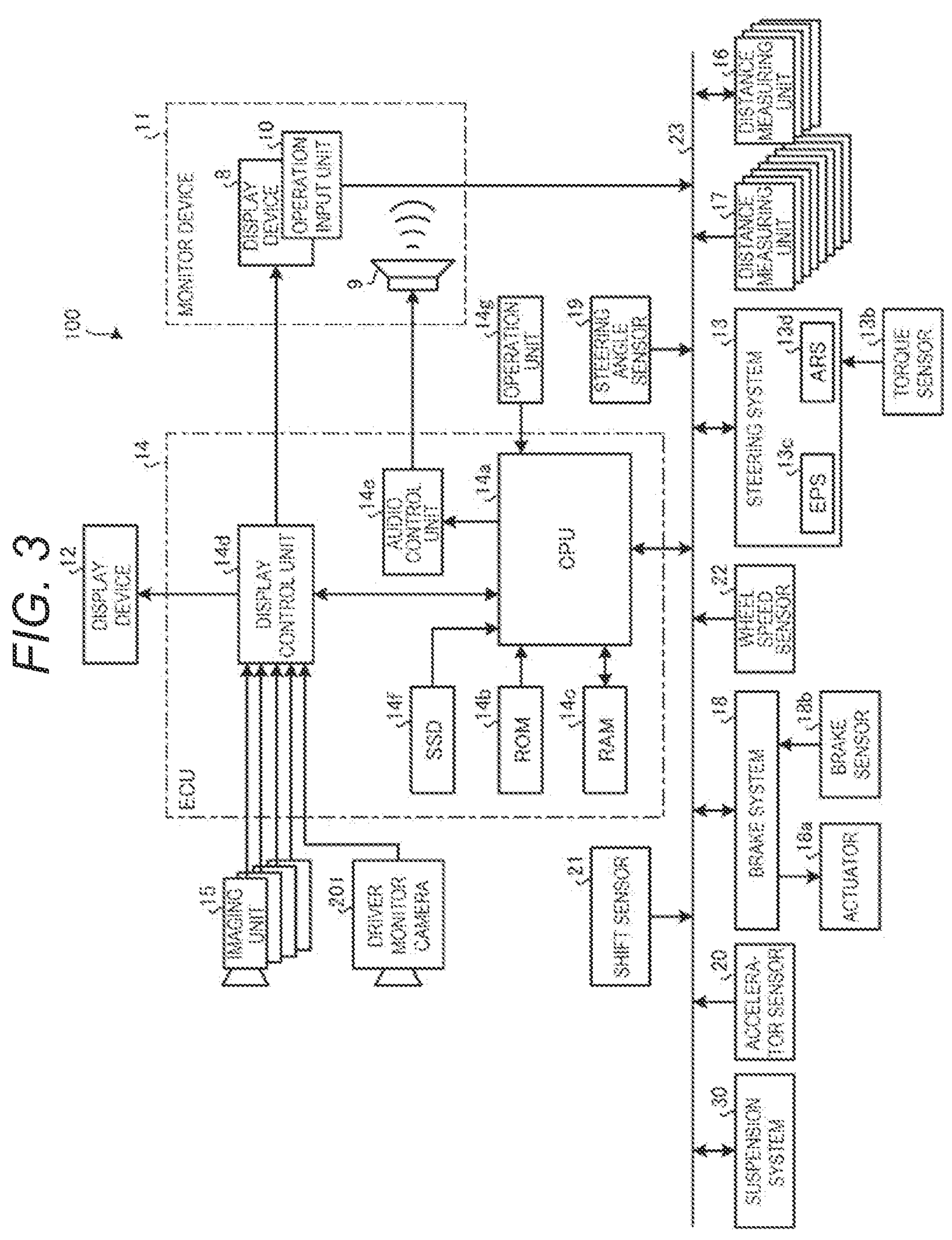
FIG. 3
100
MONITOR DEVICE
11
8
DISPLAY DEVICE
10
OPERATION INPUT UNIT
9
14
ECU
12
DISPLAY DEVICE
14d
DISPLAY CONTROL UNIT
14e
AUDIO CONTROL UNIT
14a
CPU
14g
OPERATION UNIT
14f
SSD
14b
ROM
14c
RAM
15
IMAGING UNIT
201
DRIVER MONITOR CAMERA
19
STEERING ANGLE SENSOR
21
SHIFT SENSOR
23
16
DISTANCE MEASURING UNIT
17
DISTANCE MEASURING UNIT
13
STEERING SYSTEM
13c
EPS
13d
ARS
13b
TORQUE SENSOR
22
WHEEL SPEED SENSOR
18
BRAKE SYSTEM
18b
BRAKE SENSOR
18a
ACTUATOR
20
ACCELERATOR SENSOR
30
SUSPENSION SYSTEM

WHEN YAW ANGLE OCCURS

WHEN NO YAW ANGLE OCCURS

VEHICLE CONTROL DEVICE

CROSS REFERENCE TO RELATED APPLICATIONS

This application is based on and claims priority under 35 U.S.C. § 119 to Japanese Patent Application 2023-050798, filed on Mar. 28, 2023, the entire content of which is incorporated herein by reference.

TECHNICAL FIELD

This disclosure relates to a vehicle control device.

BACKGROUND DISCUSSION

In the related art, there is a technique for automatically causing a vehicle to travel in an evacuation manner. For example, there is a technique in which, when a steering wheel fails, a yaw moment is generated by using a brake to cause the vehicle to travel in an evacuation manner to a target position (for example, see JP 2003-063373A (Reference 1)).

A driver feels comfortable if a behavior of a vehicle is as intended, but an occupant does not perform a driving operation. Therefore, an unintended behavior of the vehicle shakes a body and is not necessarily comfortable for the occupant. When the vehicle travels in an evacuation manner when the driver loses consciousness, the smaller the behavior of the vehicle is, the more beneficial because the posture of the driver does not become unstable.

Therefore, as a technique for performing evacuation traveling in which the behavior of the vehicle is small, in the related art, in 4WS or the like, an in-phase steering control technique is known in which front wheels and rear wheels are set to the same steering angle to implement parallel wheel angles, thereby preventing occurrence of a yaw rate. For example, a technique is known in which a mechanism capable of independently steering four wheels of a vehicle is provided, and the four wheels are changed to parallel steering angles while the vehicle is stopped to cause the vehicle to travel in an oblique direction without a yaw behavior (for example, see JP 2008-13045A (Reference 2)).

However, in such a technique in the related art, in a situation where the front wheels and the rear wheels are transiently disconnected from each other, the vehicle faces slightly to right or left depending on characteristics of tires of the front and rear wheels. Therefore, it may be difficult to cause the vehicle to perform evacuation traveling to a target evacuation position. In particular, during braking, a load on the front wheels increases, an effect on the steering angle of the front wheels increases, and an effect on the steering angle of the rear wheels decreases. Therefore, even when the front wheels and the rear wheels have the same steering angle, the yaw rate continues to occur, and the posture of the driver may collapse or the occupant may feel uncomfortable.

A need thus exists for a vehicle control device which is not susceptible to the drawback mentioned above.

SUMMARY

A vehicle control device according to an embodiment is a vehicle control device to be mounted on a vehicle. The vehicle control device includes: a target steering angle calculation unit configured to calculate a target steering angle according to a target position to which the vehicle is to be moved or a situation of a steering angle; a ratio determination unit configured to determine a ratio of steering angles of a front wheel and a rear wheel of the vehicle based on a front-rear acceleration of the vehicle; a steering angle calculation unit configured to calculate, for the front wheel and the rear wheel, steering angles determined by multiplying the target steering angle by the ratio; and a control unit configured to instruct the front wheel and the rear wheel about the calculated steering angles of the front wheel and the rear wheel.

BRIEF DESCRIPTION OF THE DRAWINGS

The foregoing and additional features and characteristics of this disclosure will become more apparent from the following detailed description considered with the reference to the accompanying drawings, wherein:

FIG. 1A is a perspective view showing a state in which a part of a vehicle cabin of a vehicle according to an embodiment is seen through;

FIG. 3 is a block diagram of a configuration of a vehicle control system in the vehicle according to the embodiment;

DETAILED DESCRIPTION

Hereinafter, an embodiment disclosed here will be described. A configuration of the embodiment to be described below, and operations, results, and effects of the configurations are examples. Embodiments disclosed here can be implemented by configurations other than the configurations disclosed in the embodiments to be described below, and at least one of various effects based on a basic configuration and a derivative effect can be obtained.

Embodiment

A vehicle 1 according to the embodiment may be, for example, an automobile using an internal combustion engine (not shown) as a drive source, that is, an internal combustion engine automobile, an automobile using an electric motor (not shown) as a drive source, that is, an electric automobile, a fuel cell vehicle, or the like, a hybrid vehicle using both of an internal combustion engine and an electric motor as a drive source, or an automobile including another drive source. The vehicle 1 can be equipped with various transmission devices, and can be equipped with various devices such as systems and components necessary for driving an internal combustion engine and an electric motor. A system, the number, a layout, and the like of devices related to driving of wheels 3 of the vehicle 1 can be set in various manners.

Figure 1A:
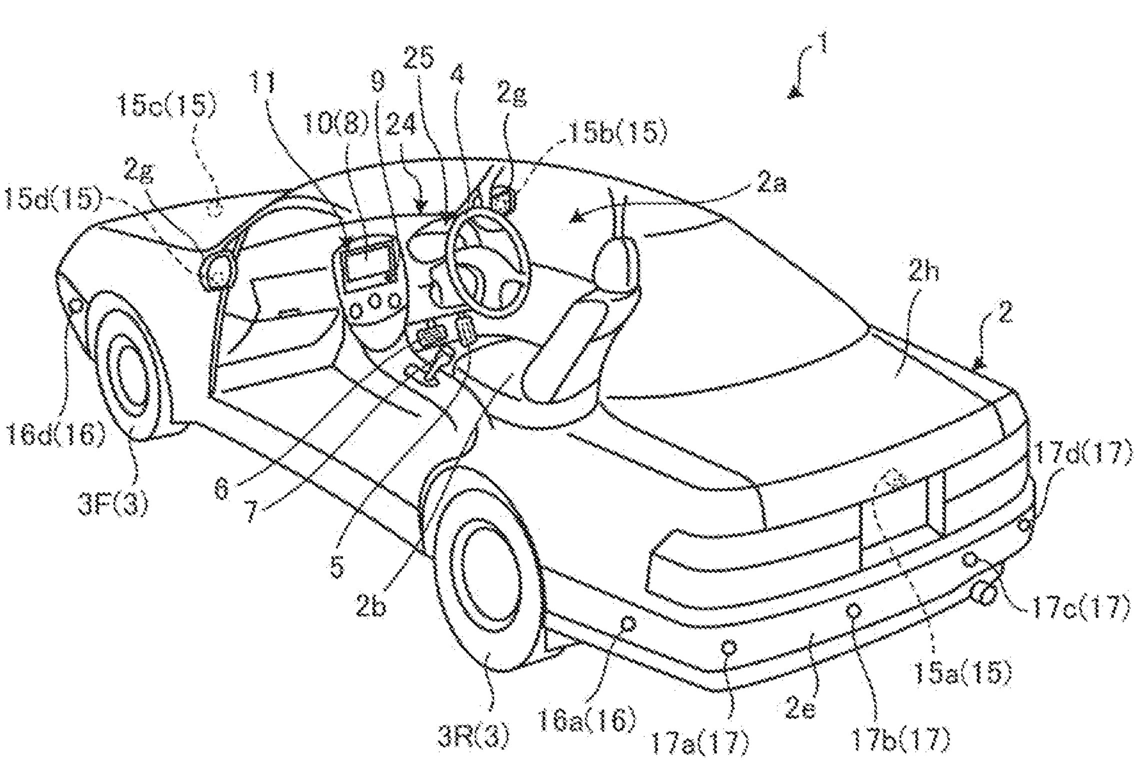
Figure 1B:
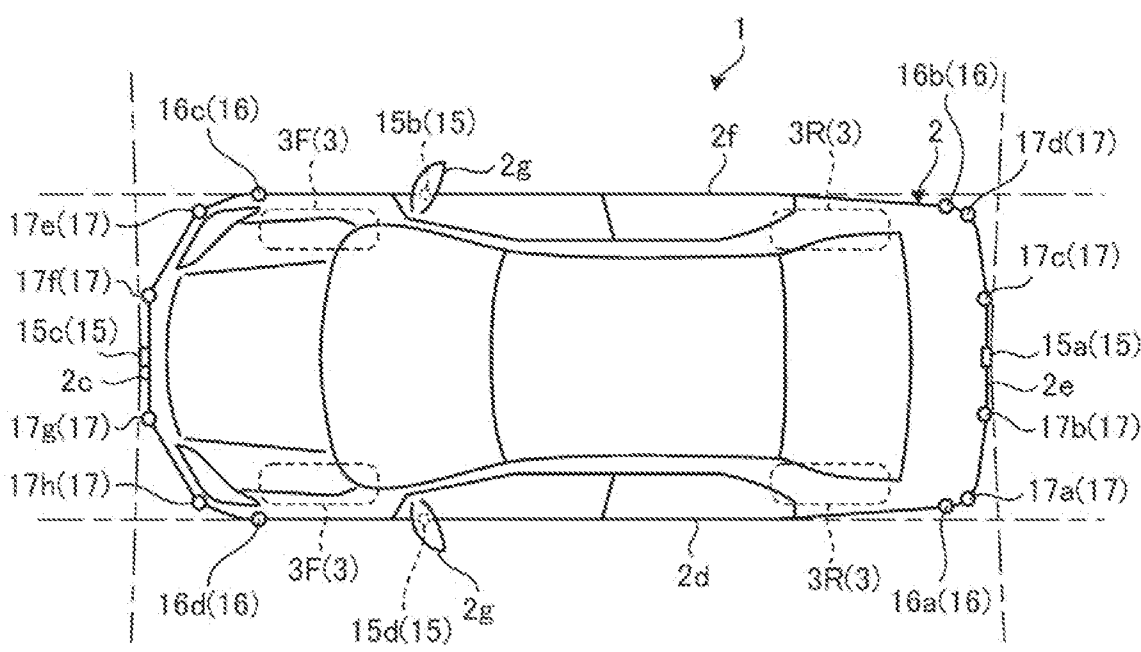
FIG. 1B is a plan view showing the vehicle according to the embodiment.
Figure 2:
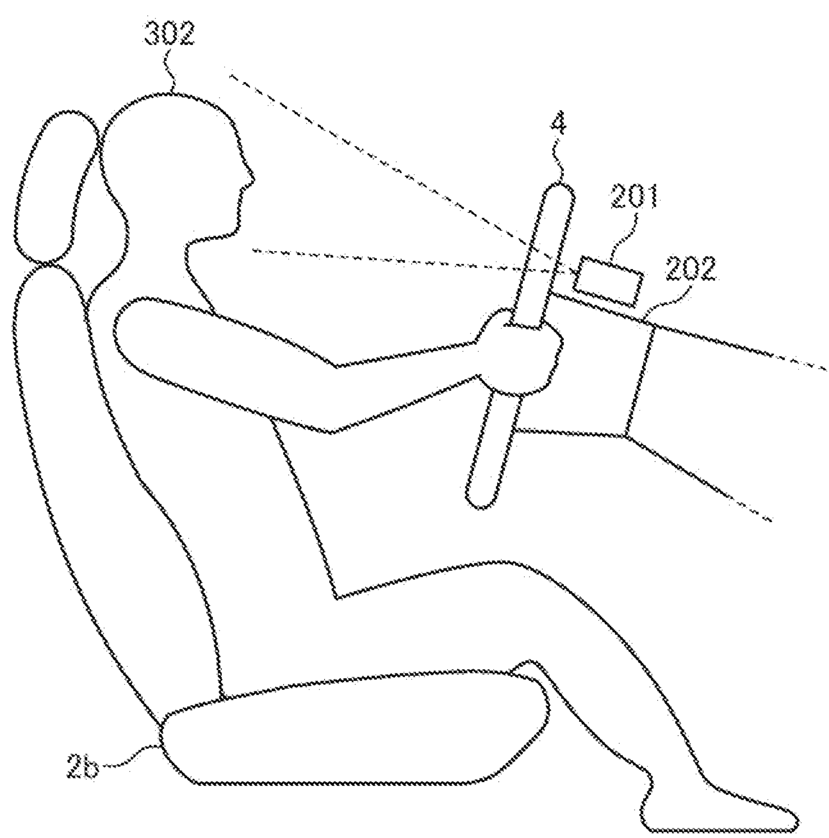
FIG. 2 is a diagram showing an example of an arrangement of imaging devices in the vehicle according to the embodiment.

FIG. 1A is a perspective view showing a state in which a part of a vehicle cabin of a vehicle according to a first embodiment is seen through. FIG. 1B is a plan view showing the vehicle according to the first embodiment. FIG. 2 is a diagram showing an example of an arrangement of imaging devices in the vehicle according to the first embodiment. FIG. 3 is a block diagram of a configuration of a vehicle control system in the vehicle according to the first embodiment.

First, an example of a configuration of the vehicle 1 according to the embodiment will be described with reference to FIGS. 1A to 3.

As shown in FIG. 1A, a vehicle body 2 constitutes a vehicle cabin 2*a* in which an occupant (not shown) rides. In the vehicle cabin 2*a*, a steering unit 4, an acceleration operation unit 5, a braking operation unit 6, a gear shift operation unit 7, and the like are provided in a state of facing a seat 2*b* of a driver as the occupant.

The steering unit 4 is, for example, a steering wheel protruding from a dashboard 24. The acceleration operation unit 5 is, for example, an accelerator pedal located under a foot of the driver. The braking operation unit 6 is, for example, a brake pedal located under the foot of the driver. The gear shift operation unit 7 is, for example, a shift lever protruding from a center console. The steering unit 4, the acceleration operation unit 5, the braking operation unit 6, the gear shift operation unit 7, and the like are not limited thereto.

In the vehicle cabin 2*a*, a display device 8 serving as a display output unit and an audio output device 9 serving as an audio output unit are provided. The display device 8 is, for example, a liquid crystal display (LCD) or an organic electroluminescent display (OELD). The audio output device 9 is, for example, a speaker. The display device 8 is covered with a transparent operation input unit 10 such as a touch panel. The occupant can visually recognize an image displayed on a display screen of the display device 8 via the operation input unit 10. The occupant can perform an operation input by touching, pressing, or moving the operation input unit 10 with a finger or the like at a position corresponding to the image displayed on the display screen of the display device 8.

The display device 8, the audio output device 9, the operation input unit 10, and the like are provided in, for example, a monitor device 11 located in a center portion of the dashboard 24 in a vehicle width direction, that is, a left-right direction. The monitor device 11 may include an operation input unit (not shown) such as a switch, a dial, a joystick, or a push button. An audio output device (not shown) may be provided at another position in the vehicle cabin 2*a* different from the monitor device 11, and audio may be output from the audio output device 9 of the monitor device 11 and another audio output device. The monitor device 11 may also be used as, for example, a navigation system or an audio system. A display device 12 different from the display device 8 is provided in the vehicle cabin 2*a*.

As shown in FIG. 2, a driver monitor camera 201 is disposed on a steering wheel column 202. The driver monitor camera 201 is, for example, a charge coupled device (CCD) camera. A viewing angle and a posture of the driver monitor camera 201 are adjusted such that a face of a driver 302 seated on the seat 2*b* is positioned at a center of a field of view. The driver monitor camera 201 sequentially captures an image of the face of the driver 302 and sequentially outputs image data of the captured image.

As shown in FIGS. 1A and 1B, the vehicle 1 is, for example, a four-wheel automobile, and includes two left and right front wheels 3F and two left and right rear wheels 3R. Each of the four wheels 3 may be configured to be steerable. As shown in FIG. 3, the vehicle 1 includes a steering system 13 that steers at least two wheels 3.

As shown in FIG. 3, the steering system 13 includes an actuator 13*a* and a torque sensor 13*b*. The steering system 13 is electrically controlled by an electronic control unit (ECU) 14 or the like to operate the actuator 13*a*. The steering system 13 is, for example, an electric power steering (EPS) system 13*c* that assists steering of the front wheels 3F, or an active rear steering (ARS) system 13*d* that steers the rear wheels 3R. The torque sensor 13*b* detects, for example, torque applied to the steering unit 4 by the driver.

As shown in FIG. 3, the vehicle body 2 is provided with, for example, four imaging units 15*a* to 15*d* as a plurality of imaging units 15. The imaging unit 15 is, for example, a digital camera including an imaging element such as a charge coupled device (CCD) or a CMOS image sensor (CIS). The imaging unit 15 can output video data at a predetermined frame rate. Each of the imaging units 15 has a wide-angle lens or a fish eye lens, and can image a range of, for example, 140° to 190° in a horizontal direction. An optical axis of the imaging unit 15 is set obliquely downward. Accordingly, the imaging unit 15 sequentially captures images of an external environment around the vehicle body 2 including a road surface on which the vehicle 1 can move and a region in which the vehicle 1 can be parked, and outputs the captured images as captured image data.

The imaging unit 15*a* is located, for example, on an end portion 2*e* on a rear side of the vehicle body 2, and is provided on a wall portion below a door 2*h* of a rear trunk. The imaging unit 15*b* is located, for example, on an end portion 2*f* on a right side of the vehicle body 2, and is provided on a right door mirror 2*g*. The imaging unit 15*c* is located, for example, on a front side of the vehicle body 2, that is, on an end portion 2*c* on a front side in a vehicle front-rear direction, and is provided on a front bumper or the like. The imaging unit 15*d* is located, for example, on a left side of the vehicle body 2, that is, on an end portion 2*d* on a left side in the vehicle width direction, and is provided on a left door mirror 2*g* serving as a protrusion portion. The ECU 14 can execute arithmetic processing and image processing based on image data obtained by the plurality of imaging units 15 to generate an image having a wider viewing angle or generate a virtual overhead image of the vehicle 1 viewed from above. The overhead image can also be referred to as a planar image.

In the embodiment, the imaging unit 15*c* serving as an imaging device provided on the front side of the vehicle body 2 images a road surface in front of the vehicle 1 in a traveling direction. When the vehicle 1 moves backward, a rear side of the vehicle 1 may be the traveling direction, and the imaging unit 15*a* may image a road surface behind the vehicle 1.

As shown in FIGS. 1A and 1B, the vehicle body 2 is provided with, for example, four distance measuring units 16*a* to 16*d* and eight distance measuring units 17*a* to 17*h*, as a plurality of distance measuring units 16 and 17. The distance measuring units 16 and 17 are, for example, sonars that emit ultrasonic waves and capture reflected waves thereof. The sonar can also be referred to as a sonar sensor or an ultrasonic detector. The ECU 14 can measure, based on detection results of the distance measuring units 16 and 17, presence or absence of an object such as an obstacle located around the vehicle 1 and a distance to the object. That is, the distance measuring units 16 and 17 are examples of a detection unit that detects an object. The distance measuring unit 17 may be used to detect, for example, an object at a relatively short distance. The distance measuring unit 16 may be used to detect, for example, an object at a relatively long distance farther away than the distance measuring unit 17. For example, the distance measuring unit 17 can be used to detect an object in front of and behind the vehicle 1, and the distance measuring unit 16 can be used to detect an object on a side of the vehicle 1.

As shown in FIG. 3, in a vehicle control system 100, in addition to the ECU 14, the monitor device 11, the steering system 13, the distance measuring units 16 and 17, a brake system 18, a suspension system 30, a steering angle sensor 19, an accelerator sensor 20, a shift sensor 21, a wheel speed sensor 22, and the like are electrically connected via an in-vehicle network 23 serving as an electric communication line. The in-vehicle network 23 is implemented as, for example, a controller area network (CAN).

The ECU 14 can control the steering system 13, the brake system 18, and the like by transmitting a control signal through the in-vehicle network 23. The ECU 14 can receive, via the in-vehicle network 23, detection results of the torque sensor 13*b*, a brake sensor 18*b*, the steering angle sensor 19, the distance measuring unit 16, the distance measuring unit 17, the accelerator sensor 20, the shift sensor 21, the wheel speed sensor 22, and the like, an operation signal of the operation input unit 10 and the like.

The ECU 14 includes, for example, a central processing unit (CPU) 14*a*, a read only memory (ROM) 14*b*, a random access memory (RAM) 14*c*, a display control unit 14*d*, an audio control unit 14*e*, and a solid state drive (SSD, a flash memory) 14*f*.

The CPU 14*a* can execute various types of arithmetic processing and control such as image processing related to images displayed on the display devices 8 and 12, determination of a target position of the vehicle 1, calculation of a movement path of the vehicle 1, determination of presence or absence of interference with an object, automated control of the vehicle 1, cancellation of the automated control, damping control of the suspension system 30, spring constant switching control, steering control, and stabilizer control. The CPU 14*a* can read a program installed and stored in a nonvolatile storage device such as the ROM 14*b* and execute arithmetic processing according to the program.

The RAM 14*c* temporarily stores various types of data used in calculation executed by the CPU 14*a*. The display control unit 14*d* mainly executes image processing using image data obtained by the imaging unit 15, synthesis of the image data displayed on the display device 8, and the like among the arithmetic processing executed by the ECU 14. The audio control unit 14*e* mainly executes processing of audio data output by the audio output device 9 among the arithmetic processing executed by the ECU 14. The SSD 14*f* is a rewritable nonvolatile storage unit, and can store data even when the ECU 14 is powered off. The CPU 14*a*, the ROM 14*b*, the RAM 14*c*, and the like may be integrated into the same package. The ECU 14 may use another logical operation processor such as a digital signal processor (DSP), a logic circuit, or the like instead of the CPU 14*a*. A hard disk drive (HDD) may be provided instead of the SSD 14*f*, and the SSD 14*f* and the HDD may be provided separately from the ECU 14.

The brake system 18 is, for example, an anti-lock brake system (ABS) that prevents locking of a brake, an anti-skid device (electronic stability control (ESC)) that prevents skidding of the vehicle 1 during cornering, an electric brake system that enhances a braking force (executes a brake assist), and brake by wire (BBW). The brake system 18 applies a braking force to the wheels 3 and the vehicle 1 via an actuator 18*a*. The brake system 18 can detect locking of the brake, idling of the wheels 3, signs of skidding, and the like based on a rotation difference between the left and right wheels 3 and the like, and execute various types of control. The brake sensor 18*b* is, for example, a sensor that detects a position of a movable portion of the braking operation unit 6. The brake sensor 18*b* can detect a position of a brake pedal as a movable portion. The brake sensor 18*b* includes a displacement sensor.

The steering angle sensor 19 is, for example, a sensor that detects a steering amount of the steering unit 4 such as a steering wheel. The steering angle sensor 19 includes, for example, a Hall element. The ECU 14 acquires the steering amount of the steering unit 4 by the driver, a steering amount of each wheel 3 during automated steering, and the like from the steering angle sensor 19, and executes various types of control. The steering angle sensor 19 detects a rotation angle of a rotation portion in the steering unit 4.

The accelerator sensor 20 is, for example, a sensor that detects the position of a movable portion of the acceleration operation unit 5. The accelerator sensor 20 can detect a position of the accelerator pedal as the movable portion. The accelerator sensor 20 includes a displacement sensor.

The shift sensor 21 is, for example, a sensor that detects a position of a movable portion of the gear shift operation unit 7. The shift sensor 21 can detect positions of a lever, an arm, a button, and the like as the movable portion. The shift sensor 21 may include a displacement sensor or may be implemented as a switch.

The wheel speed sensor 22 is a sensor that detects an amount of rotation of the wheel 3 and the number of rotations per unit time. The wheel speed sensor 22 outputs, as a sensor value, a wheel speed pulse number indicating the detected number of rotations. The wheel speed sensor 22 may include, for example, a Hall element. The ECU 14 calculates a movement amount of the vehicle 1 based on the sensor value acquired from the wheel speed sensors 22, and executes various types of control. The wheel speed sensor 22 may be provided in the brake system 18. In this case, the ECU 14 acquires a detection result of the wheel speed sensor 22 via the brake system 18.

The suspension system 30 is disposed between the vehicle body 2 and the wheels 3 of the vehicle 1. The suspension system 30 includes a spring that absorbs a vibration of the vehicle 1 due to an impact on the vehicle 1 from a road surface, and a damping force variable damper that damps the vibration of the spring and can change a damping force of the vibration of the spring. In the embodiment, the suspension system 30 cooperates with the ECU 14 to control a damping force adjusting device such as a solenoid actuator to change the damping force of the damping force variable damper. The suspension system 30 implements an adaptive variable suspension system (AVS) that damps vibrations in a vertical direction, a lateral direction, and the front-rear direction of the vehicle body due to an impact on the vehicle 1 from the road surface.

An acceleration sensor (not shown) is provided in the vicinity of each of a portion of the vehicle on a vehicle body 2 side with respect to the suspension system 30 (also referred to as a sprung portion) and a portion of the vehicle 1 on a wheel 3 side with respect to the suspension system 30 (also referred to as an unsprung portion).

Configurations, arrangements, electrical connection forms, and the like of the various sensors and actuators described above are merely examples, and can be set (changed) in various ways.

Figure 4:
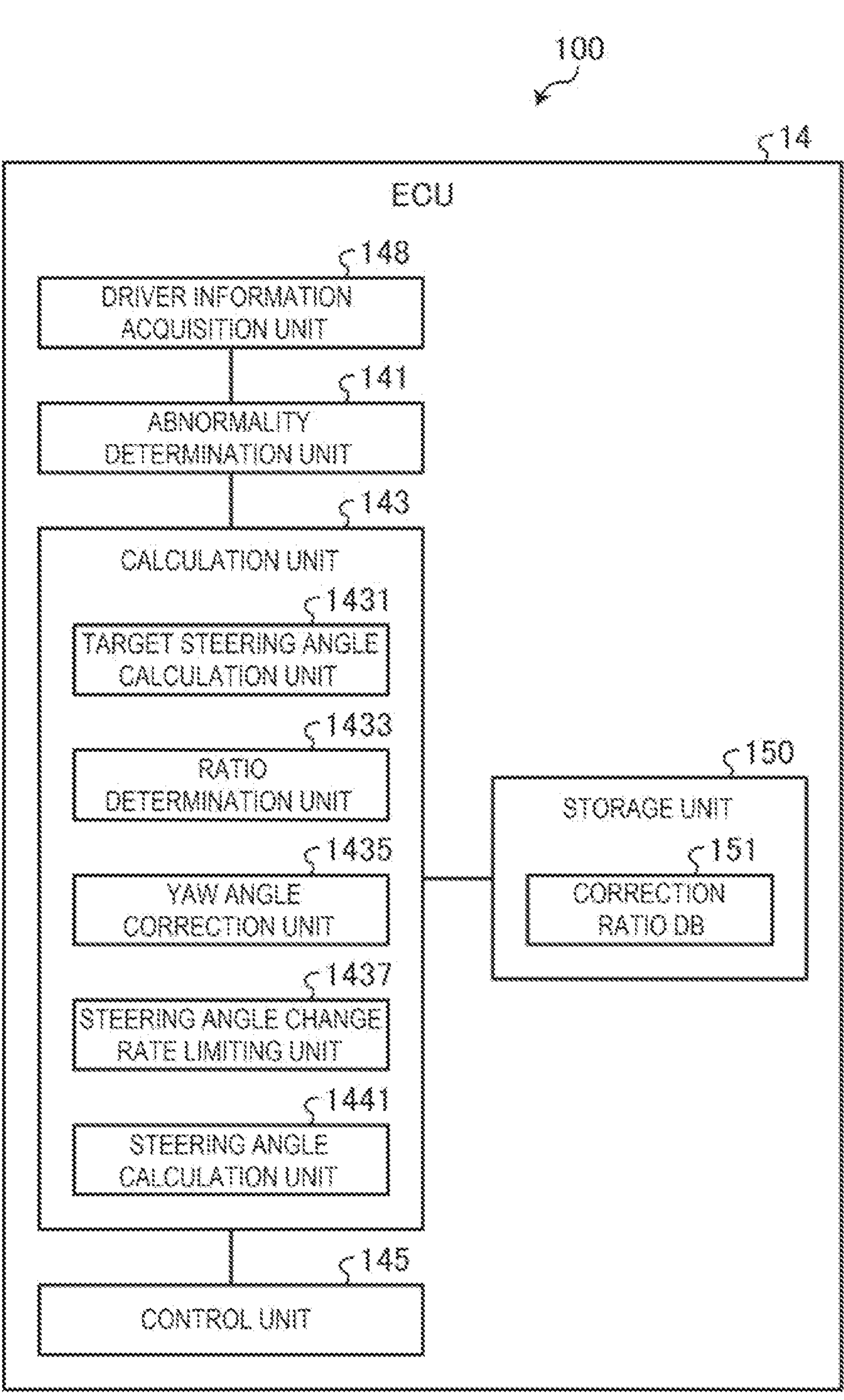
FIG. 4 is a diagram showing an example of the functional configuration of an ECU in the vehicle according to the embodiment.

Next, an example of a functional configuration of the ECU 14 in the vehicle 1 according to the embodiment will be described with reference to FIG. 4. FIG. 4 is a diagram showing an example of the functional configuration of the ECU 14 in the vehicle according to the first embodiment.

As shown in FIG. 4, the ECU 14 according to the embodiment functions as a vehicle control device including at least a driver information acquisition unit 148, an abnormality determination unit 141, a calculation unit 143, a control unit 145, and a storage unit 150.

Various functional modules such as the driver information acquisition unit 148, the abnormality determination unit 141, the calculation unit 143, and the control unit 145 are examples, and each functional module may be integrated or subdivided as long as similar functions can be implemented.

The driver information acquisition unit 148 acquires an image captured by the driver monitor camera 201.

The abnormality determination unit 141 analyzes the captured image acquired by the driver information acquisition unit 148 and determines whether the driver is abnormal. Here, an abnormality of the driver corresponds to, for example, dozing or losing consciousness, but is not limited thereto.

The calculation unit 143 calculates steering angles of the front wheels 3F and the rear wheels 3R according to a target position to which the vehicle 1 is moved or a situation of the steering angles. More specifically, when it is determined that the driver is abnormal and that there is a possibility of a collision with a preceding vehicle ahead based on a detection result of the distance measuring unit 16 or the like, the calculation unit 143 calculates steering angles of the front wheels 3F and the rear wheels 3R for causing the vehicle 1 to travel in an evacuation manner.

Figure 5:
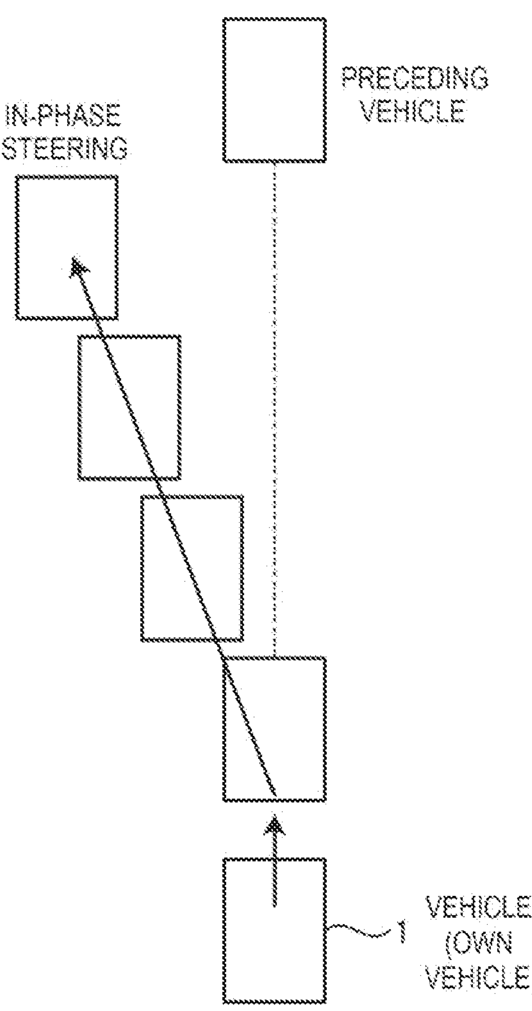
FIG. 5 is a diagram showing an example of evacuation traveling of a vehicle according to the embodiment.

FIG. 5 is a diagram showing an example of evacuation traveling of the vehicle 1 according to the embodiment. As shown in FIG. 5, in the embodiment, the vehicle control system 100 causes the vehicle to travel in an evacuation manner by steering the front wheels 3F and the rear wheels 3R in the same phase. Therefore, the calculation unit 143 calculates the steering angle for causing the vehicle 1 to travel in an evacuation manner by the in-phase steering.

Returning to FIG. 4, the calculation unit 143 includes a target steering angle calculation unit 1431, a ratio determination unit 1433, a yaw angle correction unit 1435, a steering angle change rate limiting unit 1437, and a steering angle calculation unit 1441, as shown in FIG. 4.

The target steering angle calculation unit 1431 calculates a target steering angle based on a target position at which the vehicle is evacuated.

Figure 6A:
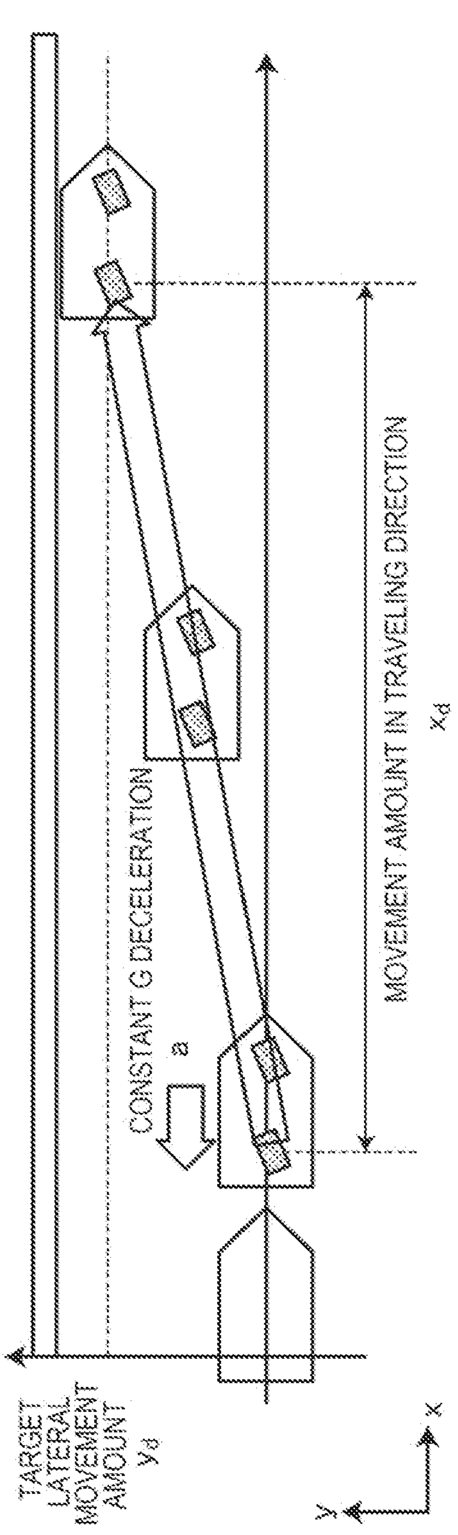
FIG. 6A is a diagram showing an example of a method for calculating a target steering angle according to the embodiment.
Figure 6B:
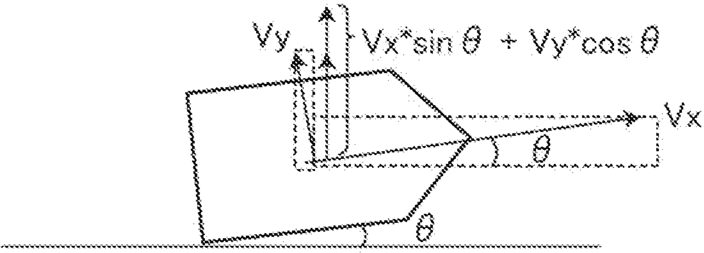
FIG. 6B is a diagram showing an example of a method for calculating the target steering angle according to the embodiment.

FIGS. 6A and 6B are diagrams showing an example of a method for calculating the target steering angle according to the embodiment. Specifically, the target steering angle calculation unit 1431 calculates, based on an initial speed and a deceleration of the vehicle 1 and a maximum rear angle, a movement amount $x_d$ in the traveling direction and a target lateral movement amount $y_d$ to a stop target position. The target steering angle calculation unit 1431 calculates the target steering angle by the following expression (1).

$$\text{Target steering angle}=\arctan(y_d/x_d) \qquad (1)$$

Although the steering angle of the front wheels 3F becomes the target steering angle, the steering angle of the rear wheels 3R is corrected as follows.

The ratio determination unit 1433 determines a ratio of the steering angles between the front wheels and the rear wheels of the vehicle 1 based on a front-rear acceleration of the vehicle 1.

When the steering angle of the front wheels 3F and the steering angle of the rear wheels 3R are the same, a yaw rate may occur, and the vehicle 1 may rotate without moving in parallel.

Figure 7:
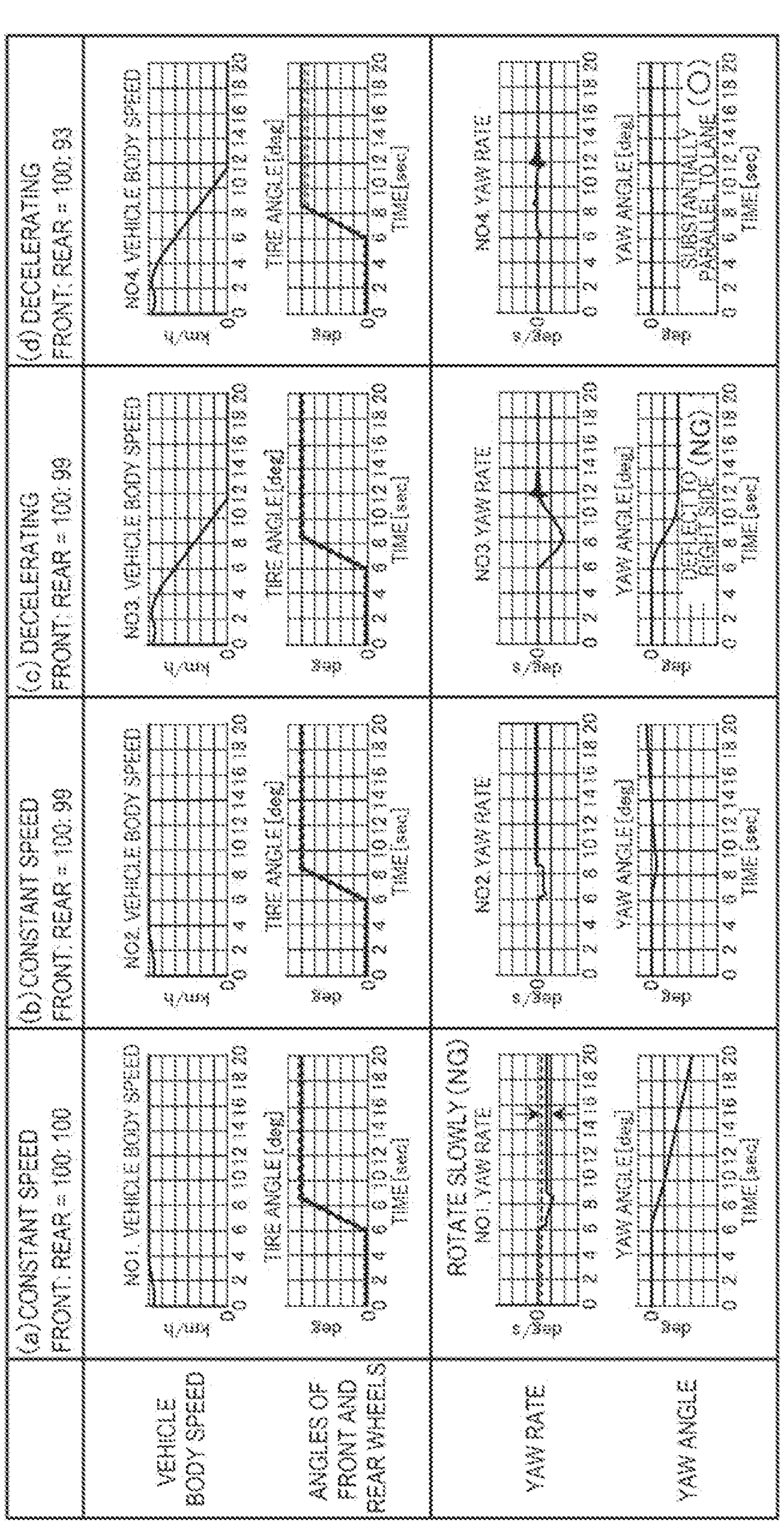
FIG. 7 is a diagram showing a relationship between a ratio of front and rear wheels and a speed of the vehicle in the embodiment.

FIG. 7 is a diagram showing a relationship between a ratio of the front and rear wheels and a speed of the vehicle in the embodiment. In a graph in FIG. 7, a horizontal axis represents time, and a vertical axis represents a speed of the vehicle 1 (vehicle body speed), angles of the front and rear wheels, a yaw rate, and a yaw angle.

When the speed of the vehicle 1 is constant, if a ratio of a steering angle of the front wheels 3F to a steering angle of the rear wheels 3R is 100:100, that is, if the steering angle of the front wheels 3F and the steering angle of the rear wheels 3R are the same, as shown in (a) of FIG. 7, a yaw rate occurs in the vehicle 1, and thus the yaw angle becomes negative, and the vehicle 1 rotates slowly.

Therefore, in the embodiment, the ratio determination unit 1433 determines the ratio of the steering angle of the front wheels 3F to the steering angle of the rear wheels 3R as 100:99. In this way, as shown in (b) of FIG. 7, no yaw rate occurs in the vehicle 1, and the vehicle 1 travels in an evacuation manner while moving parallel to a lane.

When the ratio of the steering angle of the front wheels 3F to the steering angle of the rear wheels 3R is 100:99, if the vehicle 1 is decelerating, as shown in (c) of FIG. 7, a yaw rate occurs in the vehicle 1, and thus the vehicle 1 is slightly deflected to a right side. That is, it is necessary to determine the ratio of the steering angle of the front wheels 3F to the steering angle of the rear wheels 3R according to the front-rear acceleration of the vehicle 1.

Therefore, in the embodiment, while the vehicle 1 is decelerating, the ratio determination unit 1433 determines the ratio of the steering angle of the front wheels 3F to the steering angle of the rear wheels 3R as 100:93. In this way, as shown in (d) of FIG. 7, no yaw rate occurs in the vehicle 1, and the vehicle 1 travels in an evacuation manner while moving parallel to a lane.

Thus, in the embodiment, the ratio determination unit 1433 determines the ratio of the steering angle of the front wheels 3F to the steering angle of the rear wheels 3R based on the front-rear acceleration of the vehicle 1. Specifically, a correction ratio database 151 (also referred to as a correction ratio DB 151) is prepared in which a range of the front-rear acceleration and the ratio of the steering angle of the front wheels 3F to the steering angle of the rear wheels 3R are associated with each other and stored in the storage unit 150 in advance.

The ratio determination unit 1433 detects the front-rear acceleration by the acceleration sensor, and determines the ratio of the steering angle of the front wheel 3F to the steering angle of the rear wheel 3R associated with the range to which the detected front-rear acceleration belongs in the correction ratio DB 151 as a ratio to be adopted.

The yaw angle correction unit 1435 determines a correction value based on a yaw angle of the vehicle 1. The yaw angle correction unit 1435 is an example of a correction unit.

Here, as shown in FIGS. 6A and 6B, an X-Y coordinate system is considered. A speed of absolute coordinates (road surface) in a Y-coordinate direction is expressed by the following expression (2). Here, θ is the yaw angle.

$$\text{Speed of absolute coordinates (road surface) in Y-coordinate direction} = V_x{*}\mathrm{Sin}(\theta) + V_y{*}\cos(\theta) \quad (2)$$

When the yaw angle is negative, $V_x$*sin (yaw angle), which is a speed of the absolute coordinates in a Y direction of the speed ($V_x$) in the traveling direction of the vehicle 1, is negative with respect to a Y coordinate. Therefore, the speed in the Y direction of an absolute coordinate system represented by the expression (2) decreases, and as a result, a movement amount in the Y direction becomes insufficient.

Figure 8A:
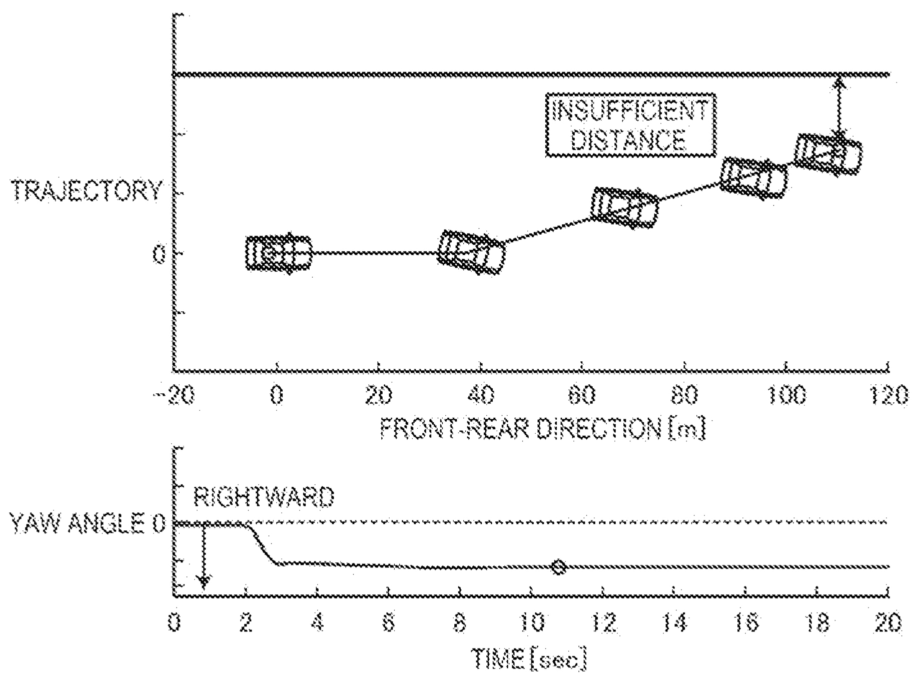
FIG. 8A is a diagram showing an example of a relationship between a front-rear direction and a trajectory of a vehicle body and changes in a yaw angle over time when a yaw angle occurs.
Figure 8B:
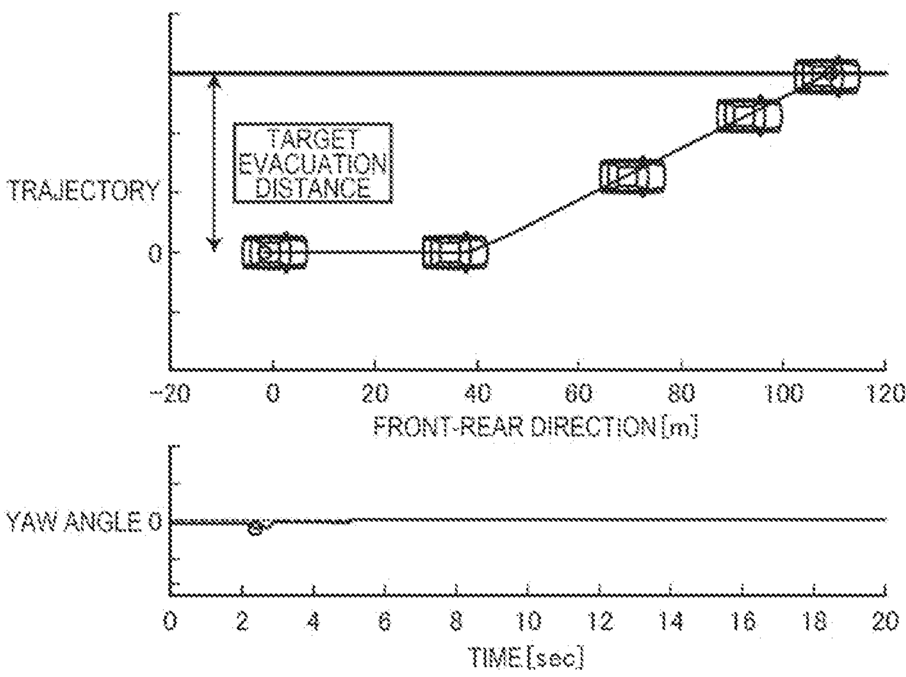
FIG. 8B is a diagram showing an example of a relationship between the front-rear direction and a trajectory of the vehicle body and changes in the yaw angle over time when no yaw angle occurs in the embodiment.
Figure 8C:
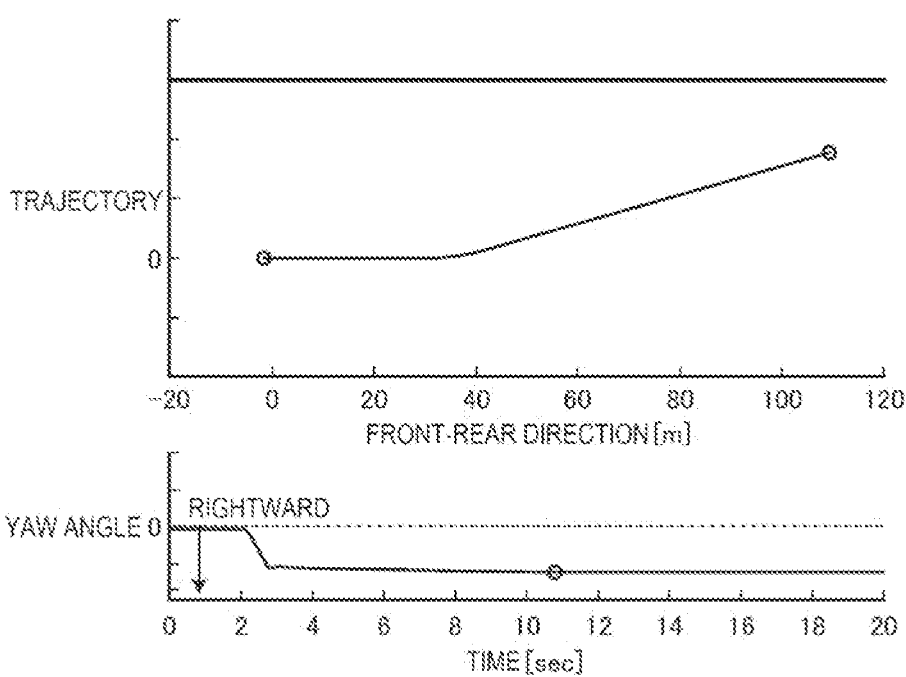
FIG. 8C is a diagram showing an example of a relationship between the front-rear direction and a trajectory of the vehicle body and changes in the yaw angle over time when a yaw angle occurs.
Figure 8D:
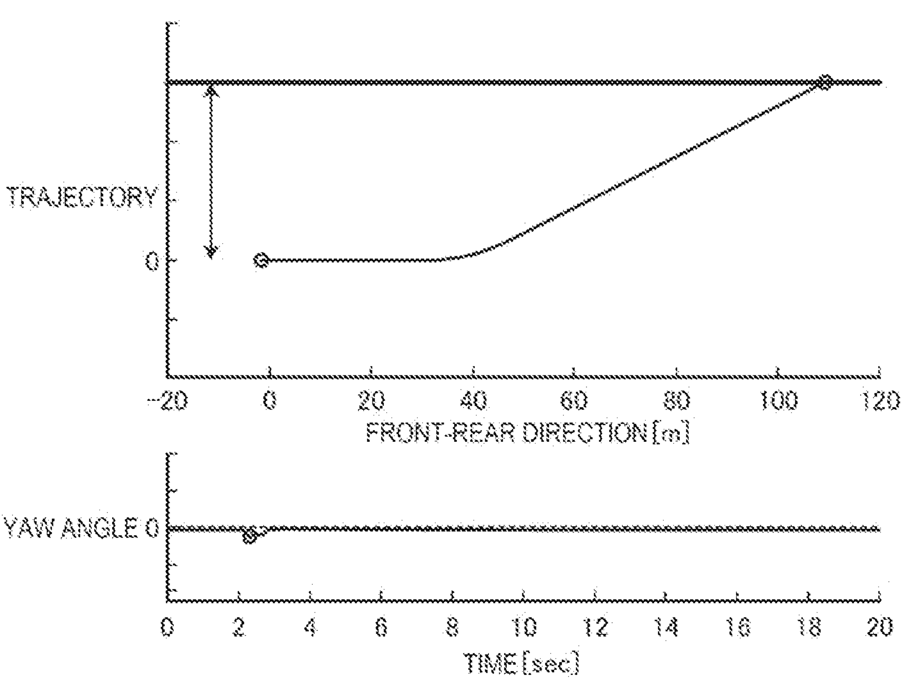
FIG. 8D is a diagram showing an example of a relationship between the front-rear direction and a trajectory of the vehicle body and changes in the yaw angle over time when no yaw angle occurs in the embodiment.

FIGS. 8A and 8C are diagrams showing examples of a relationship between the front-rear direction and a trajectory of the vehicle body and changes in the yaw angle over time when a yaw angle occurs. FIGS. 8B and 8D are diagrams showing examples of a relationship between the front-rear direction and a trajectory of the vehicle body and changes in the yaw angle over time when no yaw angle occurs.

As shown in FIGS. 8A and 8C, when a negative yaw angle (that is, a rightward yaw angle) occurs, it can be seen that vehicle 1 does not reach the target position due to insufficient distance. Meanwhile, as shown in FIGS. 8B and 8D, when the yaw angle does not occur, it can be seen that the vehicle 1 reaches a target evacuation position.

Therefore, in the embodiment, the yaw angle correction unit 1435 calculates a correction value to increase the steering angle of the rear wheel 3R in the same direction as the yaw angle, and the steering angle calculation unit 1441 corrects a target steering angle with the correction value. Accordingly, rotation of the vehicle 1 due to the negative yaw angle is prevented, and as a result, the vehicle 1 reaches the target position.

Specifically, the yaw angle correction unit 1435 calculates the correction value by the following expression (3).

$$\text{Correction value} = (0° - \text{measurement angle}){*}\text{proportional gain} \quad (3)$$

Here, as the measurement angle, for example, the yaw angle correction unit 1435 may obtain an angle of the vehicle 1 with respect to the lane based on a surrounding image captured by the imaging unit 15. The proportional gain is determined in advance by experiments or the like.

The steering angle calculation unit 1441 sets the target steering angle obtained by the target steering angle calculation unit 1431 as the steering angle of the front wheels 3F. The steering angle calculation unit 1441 multiplies the target steering angle obtained by the target steering angle calculation unit 1431, that is, the steering angle of the front wheels 3F by the ratio determined by the ratio determination unit 1433, and further adds a correction value calculated by the yaw angle correction unit 1435 to calculate a value as the steering angle of the rear wheels 3R. Specifically, the steering angle calculation unit 1441 calculates the steering angle of the rear wheels 3R by the following expression (4).

$$\text{Steering angle of rear wheels 3R} = \text{target steering angle}{*}\text{ratio} + \text{correction value} \quad (4)$$

The steering angle change rate limiting unit 1437 adjusts a change rate of the steering angle. The speed of the vehicle 1 is obtained based on a detection result by the wheel speed sensor 22, and the steering angle change rate limiting unit 1437 obtains the change rate based on the speed. The steering angle change rate limiting unit 1437 is an example of a limiting unit.

Figure 9A:
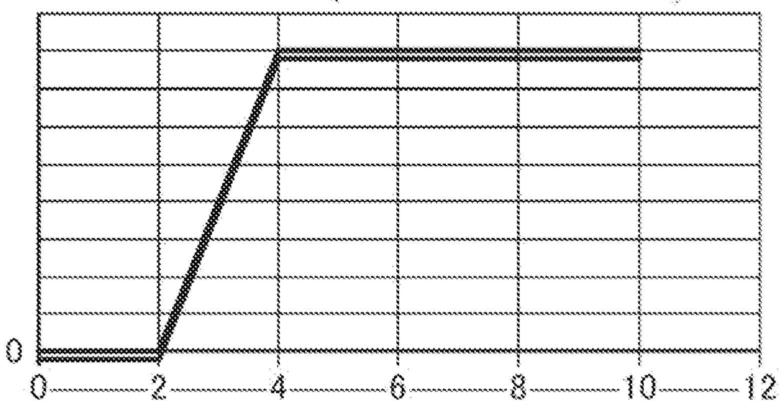
FIGS. 9AA and 9AB are diagrams showing a relationship between a steering angle and a lateral acceleration.
Figure 9A:
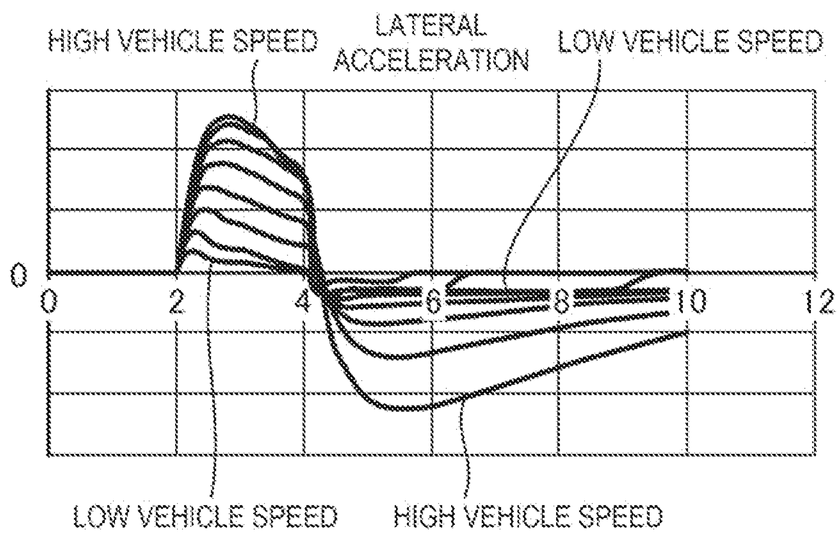

FIGS. 9AA and 9AB are diagrams showing a relationship between a steering angle and a lateral acceleration. FIG. 9AA shows a change in the steering angles of the front wheels 3F and the rear wheels 3R, in which a horizontal axis represents time and a vertical axis represents the steering angle. FIG. 9AB shows a plurality of changes in lateral accelerations for each vehicle speed, in which a horizontal axis represents time and a vertical axis represents a lateral acceleration steering angle.

As shown in FIGS. 9AA and 9AB, the steering angle is increased between 2 s and 4 s, and the lateral acceleration of the vehicle 1 between 2 s and 4 s increases as the speed of the vehicle increases. Here, the speed of the vehicle means a speed at the start of control.

Figure 9B:
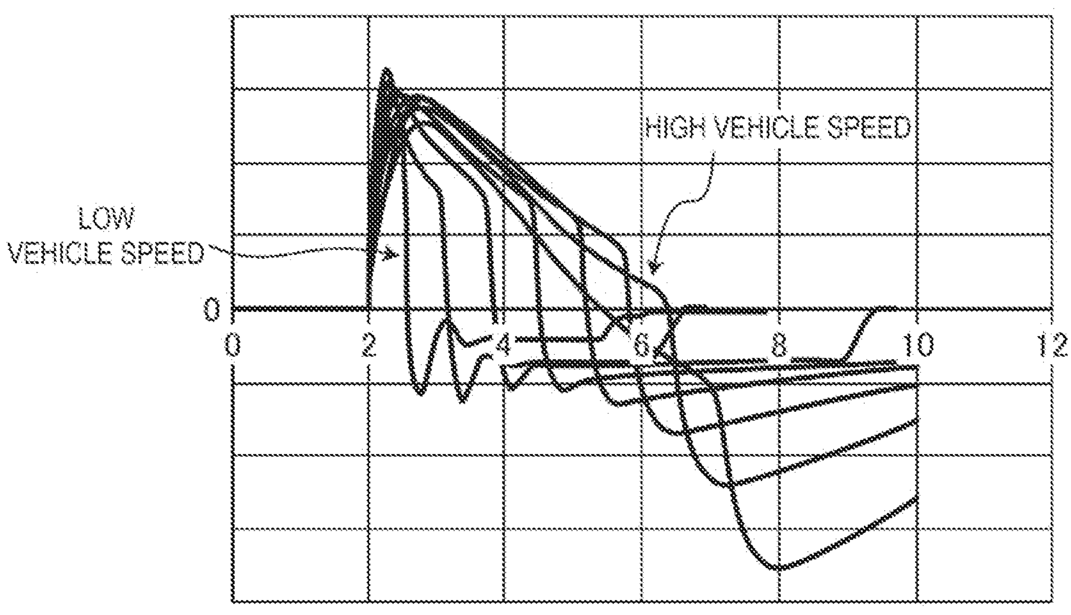
FIGS. 9BA and 9BB are diagrams showing a relationship between the steering angle, a steering angle speed, and the lateral acceleration.
Figure 9B:
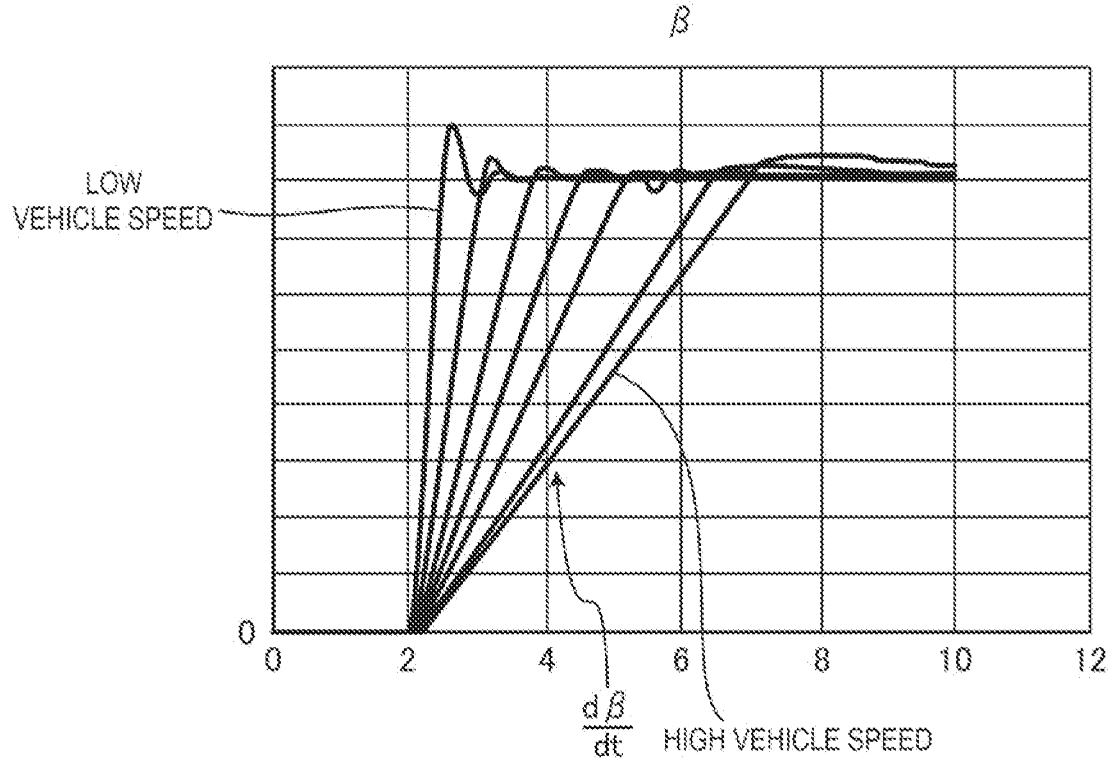

FIGS. 9BA and 9BB are diagrams showing a relationship between the steering angle, a steering angle speed, and the lateral acceleration. FIG. 9BA shows a plurality of changes in lateral accelerations for each vehicle speed, in which a horizontal axis represents time and a vertical axis represents a lateral acceleration steering angle. FIG. 9BA shows changes in the steering angles of the front wheels 3F and the rear wheels 3R, in which the horizontal axis represents time and the vertical axis represents the steering angle. FIG. 9BB shows changes in the steering angle and the steering angle speed. A horizontal axis represents time, a steering angle β (equivalent to a slip angle), and the steering angle speed, expressed as dβ/dt, which is a slope of the steering angle β in a graph in FIG. 9BB.

Therefore, as shown in FIGS. 9BA and 9BB, the lateral acceleration is constant even when the steering angle speed changes. Here, assuming that the speed of the vehicle is V, V*(dβ/dt) is constant.

In the embodiment, the steering angle change rate limiting unit 1437 determines a steering angle change rate based on the speed of the vehicle 1. Specifically, the steering angle change rate limiting unit 1437 determines a change rate of the steering angle so that the steering angle speed decreases as the speed of the vehicle 1 increases.

The control unit 145 instructs the front wheels 3F and the rear wheels 3R about the steering angle calculated by the steering angle calculation unit 1441 via the steering system 13. At this time, the control unit 145 issues an instruction via the steering system 13 so that the steering angle becomes the steering angle calculated at the change rate determined by the steering angle change rate limiting unit 1437.

The control unit 145 instructs the front wheels 3F and the rear wheels 3R about the steering angles substantially simultaneously. This disclosure is not limited thereto, and the control unit 145 may instruct the front wheels 3F and the rear wheels 3R of the steering angle at different timings.

Next, vehicle control processing by the vehicle control system 100 according to the embodiment implemented as described above will be described.

Figure 10:
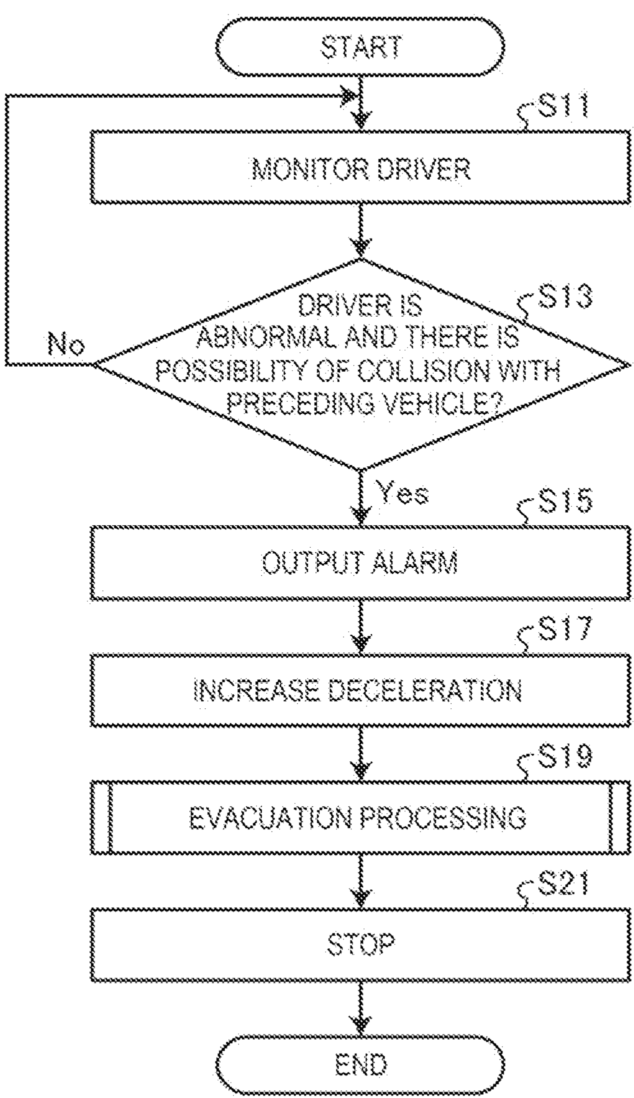
FIG. 10 is a flowchart showing an example of a procedure of vehicle control processing by the vehicle control system according to the embodiment.

FIG. 10 is a flowchart showing an example of a procedure of the vehicle control processing according to the embodiment.

First, the abnormality determination unit 141 monitors a driver based on a captured image from the driver information acquisition unit 148 (S11). The abnormality determination unit 141 determines whether the driver is abnormal and there is a possibility of a collision with a preceding vehicle (S13).

When it is determined that the driver is not abnormal, or there is no possibility of a collision with the preceding vehicle (S13: No), the abnormality determination unit 141 continues monitoring the driver.

Meanwhile, when it is determined in S13 that the driver is abnormal and there is a possibility of a collision with the preceding vehicle (S13: Yes), the abnormality determination unit 141 instructs the audio control unit 14*e* to output an alarm from the audio output device 9 (S15). The abnormality determination unit 141 increases a deceleration (S17). Evacuation processing of the vehicle 1 is executed (S19).

Figure 11:
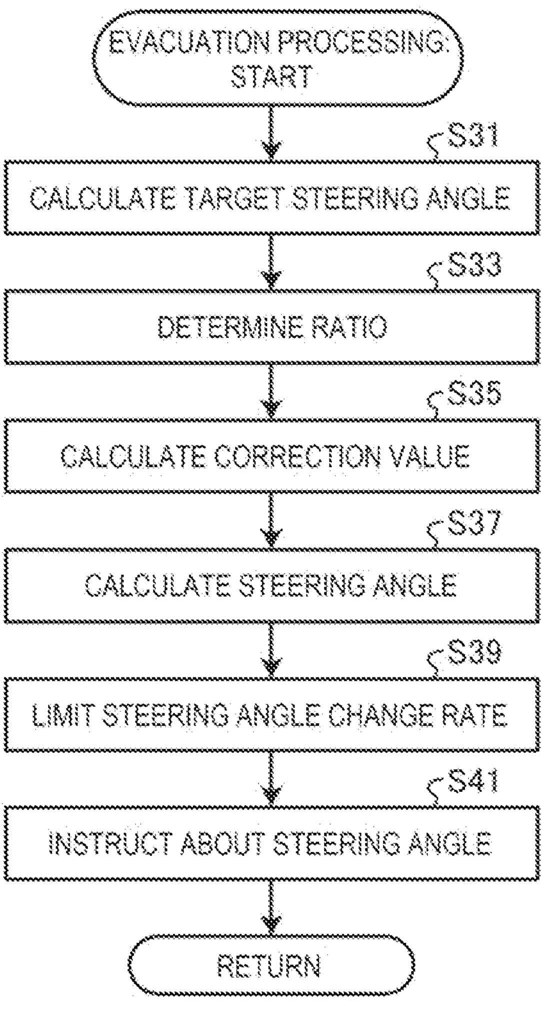
FIG. 11 is a flowchart showing an example of a procedure of evacuation processing of the vehicle according to the embodiment.

FIG. 11 is a flowchart showing an example of a procedure of the evacuation processing of the vehicle 1 according to the embodiment.

First, the target steering angle calculation unit 1431 calculates a target steering angle by the above-described method (S31). Next, the ratio determination unit 1433 calculates a ratio for correction based on a front-rear acceleration and the correction ratio DB 151 (S33). The yaw angle correction unit 1435 calculates a correction value by the above-described method (S35). Next, the steering angle calculation unit 1441 calculates a steering angle (S37). That is, the steering angle calculation unit 1441 sets the target steering angle as the steering angle of the front wheels 3F, and calculates the steering angle of the rear wheels 3R by the expression (4).

Next, the steering angle change rate limiting unit 1437 calculates a steering angle change rate and limits the change rate (S39), and the control unit 145 instructs the steering system 13 about the steering angle (S41). Then, the processing returns to a return source.

Returning to FIG. 10, when the evacuation processing is executed, the vehicle 1 stops at a target position.

As described above, in the embodiment, the vehicle control system 100 calculates the target steering angle according to the target position to which the vehicle 1 is to be moved or the situation of the steering angle, determines the ratio of the steering angles of the front wheels and the rear wheels of the vehicle 1 based on the front-rear acceleration of the vehicle 1, calculates, for the front wheels and the rear wheels, the steering angles determined by multiplying the target steering angle by the ratio, and instructs the front wheels 3F and the rear wheels 3R about the calculated steering angles of the front wheels 3F and the rear wheels 3R.

Therefore, according to the embodiment, it is possible to move the vehicle 1 to the target position while reducing an influence on an occupant by preventing a behavior of the vehicle 1.

In the embodiment, the vehicle control system 100 determines the correction value based on the yaw angle of the vehicle 1, and calculates, for the front wheels 3F and the rear wheels 3R, the steering angles obtained by correcting, with the correction value, values determined by multiplying the target steering angle by the ratio. Therefore, according to the embodiment, it is possible to reliably move the vehicle 1 to the target position by avoiding a situation in which the vehicle 1 cannot reach the target position due to the yaw angle.

In the embodiment, the vehicle control system 100 obtains the change rate of the steering angle based on the speed of the vehicle 1, and instructs the front wheels 3F and the rear wheels 3R about the steering angles to change the steering angle at the change rate. Therefore, according to the embodiment, it is possible to further reduce the influence on the occupant by making a change in the lateral acceleration constant when the steering angle is changed.

In the embodiment, the vehicle control system 100 instructs the front wheels 3F and the rear wheels 3R about the steering angle substantially simultaneously. Therefore, according to the embodiment, a moving operation of the vehicle 1 can be smoothly started.

In the embodiment, the vehicle control system 100 determines whether the driver is abnormal, calculates the target steering angle based on the target position to which the vehicle 1 is to be evacuated when it is determined that the driver is abnormal and that there is a possibility of a collision with the preceding vehicle, determines the ratio of the steering angles of the front wheels and the rear wheels of the vehicle 1 based on the front-rear acceleration of the vehicle 1, calculates, for the front wheels and the rear wheels, the steering angles determined by multiplying the target steering angle by the ratio, and instructs the front wheels 3F and the rear wheels 3R about the calculated steering angles of the front wheels 3F and the rear wheels 3R.

Therefore, according to the embodiment, when it is determined that the driver is abnormal and that there is a possibility of a collision with the preceding vehicle, it is determined that it is necessary to evacuate the vehicle 1 to the target position, it is possible to evacuate the vehicle 1 to the target position while reducing the influence on the occupant by preventing a behavior of the vehicle 1.

In the embodiment, when the abnormality determination unit 141 determines that the driver is abnormal and determines that there is a possibility of a collision with the preceding vehicle, it is determined that it is necessary to evacuate the vehicle 1 to the target position, and the calculation unit 143 calculates the target steering angle based on the target position to which the vehicle 1 is to be evacuated, but this disclosure is not limited to this.

For example, when the vehicle 1 is traveling by an automatic operation, the calculation unit 143 may calculate the target steering angle according to a situation of the steering angle when changing lanes. In this case, it is possible to reduce the influence on the occupant by preventing the behavior of the vehicle 1 during lane changes during an automatic operation.

In the embodiment, the CPU 14*a* reads and executes a program stored in a storage device such as the ROM 14*b* or the SSD 14*f*, thereby implementing various functional modules such as the driver information acquisition unit 148, the abnormality determination unit 141, the target steering angle calculation unit 1431, the ratio determination unit 1433, the yaw angle correction unit 1435, the steering angle change rate limiting unit 1437, the steering angle calculation unit 1441, and the control unit 145.

In the embodiment, various functional modules such as the driver information acquisition unit 148, the abnormality determination unit 141, the target steering angle calculation unit 1431, the ratio determination unit 1433, the yaw angle correction unit 1435, the steering angle change rate limiting unit 1437, the steering angle calculation unit 1441, and the control unit 145 are implemented by a processor such as the CPU 14*a* reading and executing a program stored in a storage device such as the ROM 14*b* or the SSD 14*f*. This disclosure is not limited thereto. For example, various functional modules such as the driver information acquisition unit 148, the abnormality determination unit 141, the target steering angle calculation unit 1431, the ratio determination unit 1433, the yaw angle correction unit 1435, the steering angle change rate limiting unit 1437, the steering angle calculation unit 1441, and the control unit 145 may be implemented by independent hardware.

A vehicle control program executed by the vehicle control device and the vehicle control system 100 according to the embodiment is provided by being incorporated in a ROM or the like in advance.

The vehicle control program executed by the vehicle control device and the vehicle control system 100 according to the embodiment may be provided by being recorded in a computer-readable recording medium such as a CD-ROM, a flexible disk (FD), a CD-R, or a digital versatile disk (DVD) as a file in an installable or executable format.

Further, the vehicle control program executed by the vehicle control device and the vehicle control system 100 according to the embodiment may be stored in a computer connected to a network such as the Internet and provided by being downloaded via the network. The vehicle control program executed by the vehicle control device and the vehicle control system 100 according to the embodiment may be provided or distributed via a network such as the Internet.

The vehicle control program executed by the vehicle control device and the vehicle control system 100 according to the embodiment has a module configuration including the above-described units (that is, the driver information acquisition unit 148, the abnormality determination unit 141, the target steering angle calculation unit 1431, the ratio determination unit 1433, the yaw angle correction unit 1435, the steering angle change rate limiting unit 1437, the steering angle calculation unit 1441, the control unit 145, and the like). As actual hardware, the CPU reads and executes the vehicle control program from the ROM to load the units on a main storage device, and the driver information acquisition unit 148, the abnormality determination unit 141, the target steering angle calculation unit 1431, the ratio determination unit 1433, the yaw angle correction unit 1435, the steering angle change rate limiting unit 1437, the steering angle calculation unit 1441, the control unit 145, and the like are generated on the main storage device.

A vehicle control device according to an embodiment is a vehicle control device to be mounted on a vehicle. The vehicle control device includes: a target steering angle calculation unit configured to calculate a target steering angle according to a target position to which the vehicle is to be moved or a situation of a steering angle; a ratio determination unit configured to determine a ratio of steering angles of a front wheel and a rear wheel of the vehicle based on a front-rear acceleration of the vehicle; a steering angle calculation unit configured to calculate, for the front wheel and the rear wheel, steering angles determined by multiplying the target steering angle by the ratio; and a control unit configured to instruct the front wheel and the rear wheel about the calculated steering angles of the front wheel and the rear wheel.

With this configuration, as an example, it is possible to move the vehicle to the target position while reducing an influence on an occupant by preventing a behavior of the vehicle.

The vehicle control device according to the embodiment further includes: a correction calculation unit configured to determine a correction value based on a yaw angle of the vehicle. The steering angle calculation unit calculates, for the front wheel and the rear wheel, steering angles obtained by correcting, with the correction value, values determined by multiplying the target steering angle by the ratio. With this configuration, as an example, it is possible to reliably move the vehicle to the target position by avoiding a situation in which the vehicle cannot reach the target position due to the yaw angle.

The vehicle control device according to the embodiment further includes: a limiting unit configured to obtain a change rate of a steering angle based on a speed of the vehicle. The control unit instructs the front wheel and the rear wheel about the steering angles to change the steering angle at the change rate. With this configuration, as an example, it is possible to further reduce the influence on the occupant by making a change in a lateral acceleration constant when the steering angle is changed.

In the vehicle control device according to the embodiment, the control unit instructs the front wheel and the rear wheel about the steering angles substantially simultaneously. With this configuration, as an example, a moving operation of the vehicle can be smoothly started.

The vehicle control device according to the embodiment further includes: an abnormality determination unit configured to determine whether a driver is abnormal. The target steering angle calculation unit calculates the target steering angle based on a target position to which the vehicle is to be evacuated when the abnormality determination unit determines that the driver is abnormal. With this configuration, as an example, when it is determined that the driver is abnormal and the vehicle needs to be evacuated to the target position, it is possible to evacuate the vehicle to the target position while reducing the influence on the occupant by preventing a behavior of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle control device to be mounted on a vehicle, the vehicle control device comprising:

a processor and a memory storing instructions configured to implement:

a target steering angle calculation unit configured to calculate a target steering angle according to a target position to which the vehicle is to be moved or a situation of a steering angle;

a ratio determination unit configured to determine a ratio of steering angles of a front wheel and a rear wheel of the vehicle based on a front-rear acceleration of the vehicle;

a steering angle calculation unit configured to calculate, for the front wheel and the rear wheel, steering angles determined by multiplying the target steering angle by the ratio;

a control unit configured to instruct the front wheel and the rear wheel about the calculated steering angles of the front wheel and the rear wheel; and a correction calculation unit configured to determine a correction value based on a yaw angle of the vehicle, wherein the steering angle calculation unit calculates, for the front wheel and the rear wheel, steering angles obtained by correcting, with the correction value, values determined by multiplying the target steering angle by the ratio.

2. The vehicle control device according to claim 1, further comprising:

a limiting unit configured to obtain a change rate of a steering angle based on a speed of the vehicle, wherein the control unit instructs the front wheel and the rear wheel about the steering angles to change the steering angles at the change rate.

3. The vehicle control device according to claim 2, further comprising:

an abnormality determination unit configured to determine whether a driver is abnormal, wherein the target steering angle calculation unit calculates the target steering angle based on the target position to which the vehicle is to be evacuated when the abnormality determination unit determines that the driver is abnormal.

4. The vehicle control device according to claim 1, wherein the control unit instructs the front wheel and the rear wheel about the steering angles substantially simultaneously.

5. The vehicle control device according to claim 4, further comprising:

an abnormality determination unit configured to determine whether a driver is abnormal, wherein the target steering angle calculation unit calculates the target steering angle based on the target position to which the vehicle is to be evacuated when the abnormality determination unit determines that the driver is abnormal.

6. The vehicle control device according to claim 1, further comprising:

an abnormality determination unit configured to determine whether a driver is abnormal, wherein the target steering angle calculation unit calculates the target steering angle based on the target position to which the vehicle is to be evacuated when the abnormality determination unit determines that the driver is abnormal.

* * * * *